United States Patent Office 2,749,372
Patented June 5, 1956

2,749,372

TRICHLORODINITROBENZENES

Harry R. Dittmar, Royal Oak, Mich., assignor to Ethyl Corporation, New York, N. Y., a corporation of Delaware No Drawing. Application July 15, 1952,
Serial No. 299,015

3 Claims. (Cl. 260—646)

This invention relates to nitration of trichlorobenzenes and more particularly to an improved method for the dinitration of trichlorobenzenes characterized by high yields of high purity dinitration products.

In the commercial production of benzene hexachloride by additive chlorination of benzene with chlorine approximately 85 per cent of the material produced is composed of steric isomers of benzene hexachloride which are inactive insecticidally. The upgrading or conversion of the inactive or "waste" isomers to products of higher utility is a problem of considerable proportions to the manufacturers of benzene hexachloride. An important way of upgrading these isomers is by dehydrochlorination to a mixture of chlorinated benzenes rich in trichlorobenzenes. One important method of further upgrading this mixture of chlorobenzenes would be nitration to yield various trichlorodinitrobenzenes, which have utility as chemical intermediates and as agricultural chemicals, for example as fungicides and insecticides.

Heretofore the dinitration of trichlorobenzenes and similar material has required two separate nitration steps, with the mononitro product produced in the first step and this product nitrated again in a second nitration reaction to produce the dinitro product. While this laborious method is capable of producing the desired materials, needless to say it is wasteful of time, equipment and reagents. Trichlorobenzenes can be produced by several other means such as the chlorination of benzenes and the chlorination of lower chlorobenzenes, deamination of trichloroaniline, etc. Compositions produced by these and other means are equally suitable for use in my invention.

One object of this invention is to provide an improved method for the dinitration of trichlorobenzenes. A further object is to produce a method for the manufacture of 1,2,4-trichloro-3,5-dinitrobenzene. An additional object is to provide a straightforward one-step process for the conversion of trichlorobenzenes to dinitrotrichlorobenzenes. Still another object is to provide a straightforward and practical means of upgrading the non-insecticidal products obtained by the additive chlorination of benzene to products of greater commercial value.

The present invention comprises nitrating trichlorobenzenes or mixtures rich in trichlorobenzenes with nitrating agents adjusted to yield a spent nitrating agent having a definite and carefully controlled water content. More specifically my invention comprises nitrating trichlorobenzenes with mixtures of nitric and sulfuric acids adjusted to yield a spent nitrating agent containing from about 3 to about 10 weight per cent water. A preferred form of the invention comprises nitrating trichlorobenzenes with a nitrating agent comprising nitric and sulfuric acids at temperatures of 100–150° C. with the composition of the nitrating agent adjusted so as to yield a spent nitrating agent containing from about 6 to about 7.5 per cent water. In this preferred embodiment the amount of nitrating agent used is from about 100 to about 150 per cent of the theoretical requirements for dinitration. It is advantageous when using this preferred embodiment to further adjust the nitrating agent so that the ratio of sulfuric acid to water in the spent nitrating agent lies between about 12/1 and about 15.5/1. When trichlorobenzenes are nitrated in accordance with my invention, higher yields together with higher purities of trichlorodinitrobenzenes are produced, than has heretofore been possible.

Nitration is an important unit process particularly in aromatic chemistry. In the aromatic series, nitration proceeds by substitution; that is, a nuclear hydrogen is replaced by the $NO_2$ group with attendant formation of a molecule of water. The nitrating agent most commonly used commercially is nitric acid. However, the water formed in the nitration process serves to dilute the nitrating agent, resulting in slower reaction rate and undesirable side reactions; for this reason dehydrating agents are usually employed to effect removal of water formed in the nitration process. The most widely used dehydrating agent used in commercial practice is sulfuric acid. Many mixtures of nitric and sulfuric acid have been used for various aromatic nitrations.

I have found that in the dinitration of trichlorobenzenes the degree of water present in the spent acid not only affects the reaction rate and the extent of side reactions, but also is critical to the yield of desired product and, surprisingly, to its purity. I have found that when the nitrating agent is adjusted to yield a spent acid having between 3 and 10 per cent water, the yields, coupled with purity of trichlorodinitrobenzenes are greatly improved over those obtained when the water content of the spent acid lies outside these limits. I have further found that the best improvement is obtained with the nitrating agent adjusted to yield a spent acid containing between about 6 and 7.5 per cent by weight water. In connection with this preferred form of the invention it is advantageous that the nitrating agent be so composed as to yield a spent acid whose ratio of sulfuric acid to water lies between about 12/1 and about 15.5/1.

Keeping in mind the teaching of the preceding paragraph, various nitrating agent compositions which will yield the spent nitrating agents of my invention can be readily calculated by those skilled in the art. In general, wide varieties of nitrating agent compositions are suitable. A group of typical nitrating agent mixtures yielding desirable spent nitrating agent compositions are illustrated in the following table:

| Nitrating Agent | | | | Spent Nitrating Agent | |
|---|---|---|---|---|---|
| $HNO_3$, percent | $H_2SO_4$, percent | $SO_3$, percent | $H_2O$, percent | $H_2O$, percent | $H_2SO_4/H_2O$ |
| At 110% of theoretical amount of nitrating agent | | | | | |
| 18 | 73 | 9 | 0 | 3 | 31.7 |
| 18 | 81.4 | 0 | 0.6 | 6.0 | 15.4 |
| 18 | 80.0 | 0 | 2.0 | 7.5 | 12.1 |
| 18 | 77.8 | 0 | 4.2 | 10 | 8.8 |
| At 150% of theoretical amount of nitrating agent | | | | | |
| 18 | 80.0 | 0 | 2.0 | 5.9 | 14.8 |

It is a feature of my invention that by controlling the proportions of water as described heretofore, the temperature at which the nitration reaction is carried out is not critical and can be varied widely. The lower limit of temperature at which nitration assumes a practical rate will vary for the compound being nitrated. The higher temperature limit is determined primarily by the temperature at which oxidation of organic material becomes so prevalent as to cause an appreciable loss of the desired product. In general, temperatures of about 100° to 150° C. will be satisfactory for use with my preferred starting materials.

It is a further advantage of my invention that the ratio of nitrating agent to the material to be nitrated can vary over rather considerable range. In general one should use at least a stoichiometrical amount of nitrating agent while amounts up to at least twice the stoichiometrical quantity can be employed. Quantities of nitrating agent greater than 1.5 times the stoichiometrical amount are rather wasteful of nitrating agent without possessing any great advantage. Therefore I prefer to use between about 100 and 150 per cent of the theoretical amount of nitrating agent.

The following examples will illustrate several modes of carrying out my invention and also will point out the benfits to be derived therefrom. All parts and percentages are parts and percentages by weight unless otherwise stated.

The first two examples illustrate typical results contained in the practice of my invention.

Example I

A reactor equipped with an agitator, a water-cooled condenser, a temperature-measuring device, a liquid feed device and external heating and cooling devices was charged with 385 parts of a nitrating agent consisting of 18 per cent nitric acid, 73 per cent sulfuric acid and 9 per cent sulfur trioxide. This nitrating agent was warmed to a temperature of 35° C. with stirring and 90.7 parts of 1,2,4-trichlorobenzene added over a period of 30 minutes. The reaction temperature increased gradually and was controlled at about 100° C. until addition was completed. The reaction temperature was then maintained at 110° C. for 6.5 hours. At the end of this time, the water content of the spent acid was 3.0 per cent. The reaction mixture was poured into a large volume of water, thereby precipitating 1,2,4-trichloro-3,5-dinitrobenzene in 90.5 per cent yield. The chlorine content of this material was 41.0 per cent, compared with a calculated chlorine content for trichlorodinitrobenzene of 39.2 per cent. The setting point of the product obtained in this example was 82.3° C.

By setting point I mean the temperature which, on slow cooling of a molten material, remains constant for a finite time. In other words, it is the "plateau" temperature of the ordinary cooling curve.

Example II

Using the procedure of Example I, but with a nitrating agent comprised of sulfuric and nitric acid whose proportions are adjusted to yield a spent acid containing 10.0 per cent water, 1,2,4-trichlorobenzene is nitrated to produce 1,2,4-trichloro-3,5-dinitrobenzene. A suitable nitrating agent is one containing 18 per cent nitric acid, 77.8 per cent sulfuric acid, and 4.2 per cent water. The yield is over 90 per cent of high purity material having a setting point greater than 80° C.

The next two examples illustrate results obtained when preferred forms of my invention are practiced.

Example III

Using the procedure of Example I, 1,2,4-trichlorobenzene was nitrated with a nitrating agent consisting of 18.0 per cent nitric acid, 81.4 per cent sulfuric acid and 0.6 per cent water. The spent acid from this nitration contained 6.0 per cent water and the ratio of sulfuric acid to water in the spent acid was 15.4/1. The yield of dinitrated product was 90.9 per cent of material containing 41.2 per cent chlorine and having a setting point of 82.6° C.

Example IV

Using the procedure of Example I, 1,2,4-trichlorobenzene was nitrated with a nitrating agent consisting of 18.0 per cent of nitric acid, 80.0 per cent sulfuric acid and 2.0 per cent water. Nitration was carried out for 6.5 hours at 110–111° C. The spent acid contained 7.5 per cent water and the ratio of sulfuric acid to water in the spent acid was 12.1/1. The yield was 92.6 per cent of the material containing 40.7 per cent chlorine and having a setting point of 85.6° C.

The following group of examples illustrates typical results I obtained using various embodiments of my invention. Example V illustrates the dinitration of 1,2,4-trichlorobenzene using a nitrating agent having 1.5 times the theoretical amount of nitric acid.

Example V 1,2,4-trichlorobenzene was nitrated at a temperature of 109–112° C. for 6.5 hours with a nitrating agent containing 18.0 per cent nitric acid, 80.0 per cent sulfuric acid and 2.0 per cent water. The amount of nitrating agent was equivalent to 1.5 times the theoretical amount of nitric acid for dinitration. The spent acid contained 5.9 per cent water and had a sulfuric acid to water ratio of 14.8/1. The yield was 95.4 per cent of material having a chlorine content of 39.2 per cent and a setting point of 97.0° C.

Example VI

Benzene hexachloride was dehydrochlorinated at temperatures of 200–250° C. in the presence of a catalytic amount of ferric chloride. The product obtained by this treatment comprised 3 per cent dichlorobenzenes, 64 per cent 1,2,4-trichlorobenzene, 23 per cent 1,2,3-trichlorobenzene and 9 per cent tetrachlorobenzenes. Without separation, this mixture was nitrated according to process of Example IV but with 150 per cent of the theoretical amount of nitrating agent. The spent acid contained 5.9 per cent water and a sulfuric acid to water ratio of 14.8/1. The yield of dinitro products was 95.3 per cent of material analyzing 40.3 per cent chlorine. The setting point, which was low due to the presence of two isomeric products, was 80.6° C.

Example VII 1,2,3-trichlorobenzene was nitrated according to procedure of Example IV except that reaction time was 7.5 hours. The spent acid contained 5.9 per cent water and a sulfuric acid to water ratio of 14.8/1. The yield of dinitro product was 96.8 per cent of material having a chlorine content of 39.5 per cent.

The following two examples, in contrast, present results obtained when nitrating agents yielding spent acids outside the range of my invention are used.

Example VIII

The procedure of Example I was followed, except that the composition of the nitrating agents was 23.9 per cent nitric acid, 45.3 per cent sulfuric acid and 30.8 per cent sulfur trioxide. This yields a spent acid containing no water. The yield of trichlorodinitrobenzene was only 86.6 per cent of impure material having a setting point of only 72° C. and a chlorine content of 42.5 per cent.

Example IX

Using the same procedure, 1,2,4-trichlorobenzene is nitrated with a nitric acid-sulfuric acid mixture adjusted to give a spent acid containing 15 per cent water. A nitrating agent composed of 18 per cent nitric acid, 73.4 per cent sulfuric acid and 8.6 per cent water, for example, will yield such a spent nitrating agent. A yield of less than 90 per cent of impure trichlorodinitrobenzene having a setting point below 80° C. is obtained.

I claim:

1. A one step process for the preparation of a trichlorodinitrobenzene comprising reacting a trichlorobenzene with a nitrating agent at a temperature between about 100° and 150° C., to form the corresponding trichlorodinitrobenzene, said nitrating agent comprising a mixture of nitric and sulfuric acids, said nitric acid being present in an amount between about 100 and 150 per cent of the stoichiometric quantity and conducting said reaction for a period sufficient to provide a spent nitrating agent containing from about 6 to about 7.5 per cent water and a sulfuric acid to water ratio of between about 12:1 to 15.5:1.

2. The process of claim 1 wherein the trichlorobenzene is 1,2,4-trichlorobenzene and the trichlorodinitrobenzene formed therein is 1,2,4-trichloro-3,5-dinitrobenzene.

3. A one step process for the preparation of trichlorodinitrobenzene comprising reacting trichlorobenzene with a nitrating agent at a temperature between about 100° and 150° C., said nitrating agent comprising nitric and sulfuric acids admixed with up to about 4.2 per cent water, said nitric acid being present in an amount between about 100 and 150 per cent of the stoichiometric quantity, conducting said reaction for a period sufficient to provide a spent nitrating agent containing from about 6 to about 7.5 per cent water and a sulfuric acid to water ratio of between about 12:1 to 15.5:1.

References Cited in the file of this patent

UNITED STATES PATENTS 2,519,317    Kolka et al. _____ Aug. 15, 1950

OTHER REFERENCES

Travaux Chimiques des Pays-Bas, vol. 40, pp. 451–53 (1920), Huffer.

Chem. Abstracts, vol. 29, pg. 6885(3), Abstract of article by Qvist and Salo appearing in Acta Acad. Aboensis Math. Phys., vol. 8, No. 4, 30 pgs. (1934); Chem. Zentr. 1934, II, pps. 594–5.